United States Patent [19]

McLaughlin

[11] Patent Number: 4,865,693

[45] Date of Patent: Sep. 12, 1989

[54] PREPARATION OF COMPLEXES OF ZIRCONIUM AND HAFNIUM TETRACHLORIDES WITH PHOSPHORUS OXYCHLORIDE

[75] Inventor: David F. McLaughlin, Oakmont, Pa.

[73] Assignee: Westinghouse Electric Corp., Pittsburgh, Pa.

[21] Appl. No.: 242,574

[22] Filed: Sep. 12, 1988

[51] Int. Cl.$^4$ .................. B01D 3/36; C01G 25/04; C01G 27/04

[52] U.S. Cl. ...................... 203/29; 203/50; 203/DIG. 16; 203/39; 203/86; 23/294 S; 423/73; 423/492

[58] Field of Search .............. 203/39, 86, 50, 51, 203/DIG. 25, 29, 28, DIG. 16; 423/73, 76, 492, 72, 78; 204/39, 130; 75/84.5; 23/294

[56] References Cited

U.S. PATENT DOCUMENTS

| | | | |
|---|---|---|---|
| 1,582,860 | 4/1926 | VanArkel et al. | 423/73 |
| 2,602,725 | 7/1952 | Wilhelm et al. | 423/489 |
| 2,618,531 | 11/1952 | Lindblad et al. | 423/77 |
| 2,816,814 | 12/1957 | Plucknett | 203/71 |
| 2,852,446 | 9/1958 | Bromberg | 203/1 |
| 2,928,722 | 3/1960 | Scheller | 203/51 |
| 2,938,769 | 5/1960 | Overholser | 423/70 |
| 3,006,719 | 10/1961 | Miller | 423/70 |
| 3,098,722 | 7/1963 | Carlson et al. | 203/29 |
| 3,671,186 | 6/1972 | Ishizuka | 423/73 |
| 3,966,458 | 6/1970 | Spink | 75/84.5 |
| 4,021,531 | 4/1977 | Besson | 423/492 |
| 4,578,252 | 3/1986 | Pastor et al. | 423/77 |
| 4,668,287 | 5/1987 | Kwon | 423/76 |

FOREIGN PATENT DOCUMENTS

| | | | |
|---|---|---|---|
| 1171664 | 7/1984 | Canada | 423/73 |
| 2543162 | 9/1984 | France | |

OTHER PUBLICATIONS

Plucknett—AEC Report ISC-51-1949.
Mackenzie & Murphy; J. Chem. Phys. 33366, 1960.
Williams; U.S. AEC Report NY00-1009, Aug. 1950.

*Primary Examiner*—Wilbur Bascomb
*Attorney, Agent, or Firm*—R. A. Stoltz

[57] ABSTRACT

This is a zirconium-hafnium separation process utilizing a complex of zirconium-hafnium chlorides and phosphorus oxychloride. The complex is introduced into a distillation column and a hafnium chloride enriched stream is taken from the top of the column and a zirconium chloride enriched stream is taken from the bottom of the column. In particular, the invention utilizes prepurification of the zirconium-hafnium chlorides prior to introduction of the complex into the distillation column to substantially eliminate iron chloride; thus, the buildup of iron chloride in the distillation column is substantially eliminated and the column can be operated in a continuous stable, and efficient manner.

7 Claims, No Drawings

PREPARATION OF COMPLEXES OF ZIRCONIUM AND HAFNIUM TETRACHLORIDES WITH PHOSPHORUS OXYCHLORIDE

CROSS-REFERENCE TO RELATED APPLICATIONS

A process for zirconium-hafnium separation is described in related application Ser. No. 943,112 filed Dec. 18, 1986 (now allowed) assigned to the same assignee. This related application provides for zirconium-hafnium separation by extractive distillation with the molten solvent containing zinc chloride, it utilizes at least 80 mole percent zinc chloride, with the remainder including a viscosity reducer of magnesium chloride, calcium chloride, or mixtures thereof.

An improved process for prepurification of zirconium-hafnium chlorides prior to preparation of a complex of zirconium-hafnium chlorides and phosphorus oxychloride for use in a distillation column for zirconium-hafnium separation (a version of the generic invention of this application) is described in relation application Ser. No. 242,572, filed Sept. 12, 1988 and assigned to the same assignee. That related application utilizes prepurification of zirconium-hafnium chlorides prior to complexing with phosphorus oxychloride by passing the zirconium-hafnium chloride through an essentially oxygen-free molten salt purification-sublimation system, and at least periodically removing iron chloride from the molten salt purification sublimation system by electrochemically plating iron out of molten salt purification-sublimation system. The molten salt in the molten salt purification-sublimation system consists essentially of a mixture of alkali metal and alkaline earth metal chlorides, zirconium-hafnium chlorides and impurities.

A process for zirconium-hafnium separation is described in related application Ser. No. 242,571, filed Sept. 12, 1988 and assigned to the same assignee. That related application utilizes a complex of zirconium and hafnium chlorides and phosphorus oxychloride introduced into a distillation column, with a hafnium chloride enriched stream of complex taken from the top of the column and a zirconium-enriched chloride stream of complex taken from the bottom of the column, followed by reduction of the zirconium or hafnium chloride from complex taken from the distillation column by electrochemically plating zirconium or hafnium out of a molten salt bath with the molten salt in the molten salt bath consisting principally of a mixture of alkali metal and alkaline earth metal chlorides and zirconium or hafnium chloride.

A process for zirconium-hafnium separation is described in related application Ser. No. 242,570, filed Sept. 12, 1988 and assigned to the same assignee. That related application utilizes an extractive distillation column with a mixture of zirconium and hafnium tetrachlorides introduced into a distillation column and a molten salt solvent circulated through the column to provide a liquid phase, and with the molten salt solvent consisting principally of lithium chloride and at least one of sodium, magnesium and calcium chlorides. Stripping of the zirconium chloride taken from the bottom of distillation column is provided by electrochemically reducing zirconium from the molten salt solvent. A pressurized reflux condenser is used on the top of the column to add zirconium-hafnium chlorides to the previously stripped molten salt solvent which is being circulated back to the top of the column.

A process for zirconium-hafnium separation is described in related application Ser. No. 242,564, filed Sept. 12, 1988 and assigned to the same assignee. That related application utilizes a feed containing zirconium and hafnium chlorides introduced into a distillation column, and a hafnium chloride enriched stream taken from the top of the column and a zirconium enriched chloride stream taken from the bottom of the column, and with reduction to metal of the zirconium and/or hafnium chloride taken from the distillation column by electrochemically reducing an alkaline earth metal in a molten salt bath with a molten salt in the molten salt bath consisting principally of a mixture of at least one alkali metal chloride and at least one alkaline earth metal chloride and zirconium or hafnium chloride, with the reduced alkaline earth metal reacting with the zirconium or hafnium chloride to produce zirconium or hafnium metal product and alkaline earth metal chloride.

A process for separating nickel from zirconium for recycling nickel-containing zirconium alloy is described in related application Ser. No. 242,573, filed Sept. 12, 1988 and assigned to the same assignee. That related application utilizes placing nickel-containing zirconium metal in a molten salt bath with the molten salt in the molten salt bath consisting principally of a mixture of at least two alkali metal flourides to produce a molten salt bath containing dissolved zirconium, electrochemically plating the nickel from the molten salt bath at a voltage sufficient to plate nickel but less than the voltage to plate zirconium to provide an essentially nickel-free molten salt bath; and then electrochemically reducing the zirconium from the essentially nickel-free molten salt bath to provide an essentially nickel-free zirconium.

A process for removing phosphorus oxychloride from a complex of zirconium or hafnium chloride and phosphorus oxychloride is described in related application Ser. No. 242,563, filed Sept. 12, 1988 and assigned to the same assignee. That related application utilizes an alkali metal chloride molten salt absorber vessel with a condenser which has the complex of zirconium or hafnium chloride and phosphorus oxychloride as the condensing fluid to scrub zirconium or hafnium chloride from the phosphorus oxychloride vapor. The process uses at least one separate vessel to strip the zirconium or hafnium chloride from the alkali metal chloride molten salt.

BACKGROUND OF THE INVENTION

This invention relates to molten salt distillation to separate hafnium from zirconium and in particular relates to using phosphorus oxychloride complex of zirconium-hafnium chloride.

Naturally occurring zirconium ores generally contain from 1 to 3 percent hafnium oxide relative to zirconium oxide. In order that the zirconium metal be acceptable as a nuclear reactor material, the hafnium content must first be reduced to low levels, due to the high neutron absorption cross section of hafnium. This separation process is difficult due to the extreme chemical similarity of the two elements. A number of techniques have been explored to accomplish this separation, with the technique currently in use in the United States involving liquid-liquid extraction of aqueous zirconyl chloride thiocyanate complex solution using methyl isobutyl ketone, generally as described in U.S. Pat. No. 2,938,679, issued to Overholser on May 31, 1960, with the removal of iron impurities prior to solvent extraction as described in U.S. Pat. No. 3,006,719, issued to Miller on Oct. 31, 1961.

Several other processes have been suggested for separation of the metal tetrachlorides generated from the ore by carbochlorination. The use of a nonaqueous separation offers significant economic incentive over those processes requiring aqueous zirconium solutions. Direct distillation of the tetrachlorides provides one possible route, relying on the difference in boiling points between zirconium tetrachloride and hafnium tetrachloride. Unfortunately, direct distillation cannot be accomplished at near atmospheric pressure, since neither tetrachloride exhibits a liquid phase except at very high pressure. U.S. Pat. No. 2,852,446, issued to Bromberg on Sept. 16, 1958, describes a high pressure distillation process where the pressure, rather than a solvent, provides for a liquid phase.

U.S. Pat. No. 2,816,814 issued to Plucknett on Dec. 17, 1957, describes extractive distillation for separation of the tetrachlorides using a stannous chloride solvent. U.S. Pat. No. 2,928,722 to Scheller, issued Mar. 15, 1960, describes the batch fractional distillation of niobium and tantalum chlorides to separate these chlorides from each other and from other chloride impurities, and uses a "flux" to provide the molten salt phase, utilizing either zirconium tetrachloride-phosphorus oxychloride complex or an alkali metal chloride and aluminum (or iron, or zirconium) chloride mixture as the flux. U.S. Pat. No. 3,966,458 issued to Spink on June 29, 1976 provides a sodium-potassium chloride solvent for use in the extractive distillation of zirconium and hafnium tetrachlorides. U.S. Pat. No. 3,671,186 issued to Ishizuka on June 20, 1972 utilizes a series of dissolution and evaporation stages with a solvent such as sodium chloride. U.S. Pat. No. 4,021,531 issued to Besson on Apr. 3, 1977, utilizes extractive distillation with an alkali metal chloride and aluminum (or iron) chloride mixture as the solvent. Extractive distillation of zirconium (hafnium) tetrachloride with a pure zinc chloride solvent has been attempted (Plucknett et al., AEC Report ISC-51, 1949), but was unsuccessful due to the formation of a highly viscous two-phase system. The anomalously high viscosity of zinc chloride is described by MacKenzie and Murphy (J. Chem. Phys., 33,366, 1960).

Of all of the molten salt distillation processes, only the above-mentioned Besson process has been brought to commercial development. This process is currently in use in France and provides product zirconium tetrachloride, relatively depleted of hafnium tetrachloride in the liquid bottoms stream, and a hafnium tetrachloride enriched vapor stream taken from the top of the column. A relatively high reflux is provided by a condenser at the top of the column and a reboiler at the bottom of the column. Because of the stability of the double salts formed with the alkali metal chloride in the solvent, it is very difficult to completely separate the product zirconium tetrachloride from the solvent, and relatively high (e.g. 500° C.) temperatures are required. Aluminum chloride in excess of 1:1 molar to alkali metal chloride is required and there is considerable carry-over of aluminum chloride into the zirconium tetrachloride leaving the stripper. French Patent 2,543,162 (9-28-84) to Brun and Guerin describes a post-stripping process for removing aluminum chloride. In addition, it should be noted that aluminum chloride is an especially hygroscopic and corrosive molten salt, and, at higher temperatures, is very difficult to handle.

Another separation process involves fractionation of the chemical complex formed by the reaction of $(Zr,Hf)C_4$ with phosphorus oxychloride ($POCl_3$). This technique was patented in 1926 by van Arkel and de Boer (U.S. Pat. No. 1,582,860), and was based on the approximately 5° C. boiling point difference between the hafnium and zirconium complex pseudoazeotropes, having the nominal compositions $3(Zr,Hf)C_4:2POCl_3$. This composition may be produced by direct reaction between liquid phosphorus oxychloride and the crude zirconium (hafnium) tetrachlorides obtained from opening of the ore.

Extensive work was done on the zirconium-halfnium tetrachloride complex with phosphorus oxychloride in the early 1950s, utilizing generally the molten salt distillation process of the aforementioned U.S. Pat. No. 1,582,860 of van Arkel and de Boer. While this extensive effort did provide some separation, the liquid in the reboiler became viscous during operation and both the reboiler liquid volatility and the Hf/Zr separation factor degraded significantly with time. Despite the extensive investment in time and money, this approach was abandoned and the U.S. effort was concentrated on the liquid-liquid extraction described in the above-mentioned U.S. Pat. No. 2,938,769 of Overholser. The liquid-liquid extraction remains the only commerically utilized process for zirconium-hafnium separation in the United States today.

SUMMARY OF THE INVENTION

It has been discovered that continuous operation of a distillation system separating the complex of zirconium-hafnium chlorides and phosphorus oxychloride requires substantial elimination of iron chloride impurity. Further, even batch separation is impractical without substantial elimination of the iron chloride, as volatility changes can make it exceedingly difficult to recover essentially hafnium-free zirconium product.

This invention utilizes a complex of zirconium hafnium chlorides and phosphorus oxychloride prepared from zirconium-hafnium chlorides, with the complex of zirconium hafnium chlorides and phosphorus oxychloride being introduced into a distillation column. A hafnium chloride enriched stream is taken from the top of the column and a zirconium chloride enriched stream is taken from the bottom of the column. In particular, the prepurifying of the zirconium-hafnium chlorides prior to introduction of the complex into the distillation column substantially eliminates iron chloride from the zirconium-hafnium chlorides and prevents buildup of iron chloride in the distillation column, allowing the column to be operated in a continuous, stable, and efficient manner.

This method separates hafnium from zirconium utilizing a complex of the tetrachlorides with phosphorus oxychloride. It utilizes a distillation column with a reboiler at the bottom and a reflux condenser at the top. This invention utilizes the improvement comprising prepurifying the zirconium-hafnium tetrachlorides prior to introduction of the complex into the distillation column, with the prepurification substantially eliminating iron chloride from the zirconium-hafnium tetrachlorides. Thus, the buildup of iron chloride in the distillation column and in the reboiler is substantially eliminated. Although other methods of prepurification can be utilized, the prepurification is preferably performed by passing the zirconium-hafnium tetrachlorides through a molten salt bath having a chemical affinity for iron chloride (e.g. a near eutectic mixture of sodium chloride, potassium chloride, and zirconium-hafnium tetrachlorides) and then subliming the zirconium-hafnium tetrachlorides from the bath, leaving the iron chloride in the molten salt purification-sublimation bath.

DESCRIPTION OF THE PREFERRED EMBODIMENTS

Despite the extensive experimentation done on the zirconium-hafnium tetrachloride complex with phosphorus oxychloride (hereinafter "complex"), and despite the fact that iron chloride was a known impurity in zirconium-hafnium tetrachloride (being removed prior to liquid-liquid extraction as described in the aforementioned Miller U.S. Pat. No. 3,006,719), it was heretofore unappreciated that iron chloride was a major source of column instability in distillation of the complex. This is perhaps because iron chloride at the normal impurity levels does not interfere with separation, but iron chloride levels in the liquid phase rise as portions of the complex are vaporized, (iron chlorides can also be introduced as the result of corrosive attack on ferrous alloy column internals) and the higher iron chloride concentrations do interfere with distillation column operation.

As can be seen from AEC Report NY00-1009, 1950, distillation of the complex produced a viscous reduced-volatility residue in the reboiler. Initial experiments by the inventor herein also produced such a viscous residue and the dropping of vapor pressure in the column. Attempts to reestablish column vapor pressure by raising temperatures gave a short period of additional column operation, but stable column operation could only be maintained temporarily.

After numerous experiments it was discovered that elimination of iron chloride from the feed complex eliminated both the changes in column pressure (at a given temperature) and eliminated the thickening of the reboiler fluid.

Crude zirconium tetrachloride obtained from opening of zirconium ores typically contains significant quantities of iron, some of which was present in the ore itself, and some of which is introduced during the milling and handling of the ore. Chlorides of a number of other impurity elements may also be present, including titanium aluminum, silicon, niobium, tantalum, uranium, and thorium, in various concentrations. All of the above chlorides also form complexes with phosphorus oxychloride, and as such may become involved in the process chemistry; the interaction of each with the distillable zirconium-hafnium chloride complex must therefore be considered.

In particular, the $POCl_3$ complexes of ferric chloride ($FeCl_3$) may be very troublesome, for a number of reasons. First of all, iron must be removed from zirconium at some point in the process to satisfy the specifications for nuclear-grade zirconium. In the solvent extraction process currently used in the United States of zirconium-hafnium separation, a special iron-removal column is devoted solely to this purpose, due to the large quantities of iron that may be present in the system. In the case of a $POCl_3$-complex fractionation process, it was previously assumed that iron removal could take place after the distillation, e.g. an alkali metal chloride molten salt system for recovery of separated $ZrCl_4$ from the complex will also accomplish removal of iron chlorides, since iron is known to form stable double salts with alkali metal chlorides (Morozov and Tsegledi, Russ. J. Inorg. Chem., 6, 1397, 1961) and will remain with the molten salt bath.

However, it has been discovered that if removal of $FeCl_3$ is deferred until the tetrachloride recovery step, the presence of the $FeCl_3$-$POCl_3$ complex will have a detrimental effect on the operation of the fractionation column. Two complexes are known: $2FeCl_3.3POCl_3$ and $FeCl_3.POC_3$ (Dadape and Rao, J. Am. Chem. Soc., 77, 6192, 1955), of which only the latter is chemically stable at the operating temperatures of the fractionation process (355 to 360° C). The $FeCl_3.POCl_3$ complex is less volatile than the zirconium and hafnium complexes, and will remain predominately in the reboiler. In a batch distillation, the iron content of the charge introduced in the feed mixture will, therefore, gradually increase in concentration. In addition, if a ferrous alloy is used for the reboiler material, iron will gradually be added to the system due to corrosion. It is probable that the very presence of iron in the system increases the corrosivity of the melt, since $FeCl_3$ is known to be a very corrosive material. I have correlated the rate of corrosion of a non-ferrous nickel alloy material in this fluid with iron chloride concentration, indicating a nearly linear relationship. Iron containing alloys should be therefore avoided in the distillation system.

I have also correlated the effect of increasing Fe concentration in the melt with a decrease in melt volatility in both batch and continuous distillation experiments. The effective boiling point of the reboiler charge was observed to increase steadily during a batch distillation, as did the iron content of the melt. As the iron concentration continued to rise, the rate of rise of the boiling point of the melt also increases, such that a point was reached at an iron-to-zirconium ration of 4–5% where the melt no longer behaved as a volatile mixture, and the distillation had to be discontinued.

This problem proved to be a major difficulty in previous attempts to commercialize the $POCl_3$-complex fractionation process for zirconium-hafnium separation. Williams et al. (U.S. AEC Report NY00-1009, 1950) observed not only accumulation of nonvolatile material in the reboiler during batch distillations, but a great reduction in the degree of separation of zirconium and hafnium after a certain point, when carried out in a stainless steel reboiler. Even during continuous distillations, situations are described when the overheads product flow would gradually diminish and the column temperature rise, accompanied by a decrease in separation. This was cured by introduction of additional feed to the reboiler, and the problem attributed to "an insufficient amount of material in the column for efficient . . . operation." The erratic and degraded separation factors which resulted from Williams' test program was one of the major factors leading to abandonment of this process by the AEC in 1950. It is now believed that the probable cause was production of a non-volatile phase, high in $FeCl_3$.

It may be observed that as iron chlorides accumulate due to corrosion in a stainless steel system, $POCl_3$ is destroyed by the corrosion reaction, and additional $POCl_3$ bound up by complexation with the corrosion products. Since the distillable composition $3(Zr,Hf)Cl_4.2POCl_3$ is not a chemical compound but rather a complex azeotrope, its properties are dependent on the specific ratio of $(Zr,Hf)Cl_4$ to $POCl_3$ in the system. Any shift in this ratio will cause the properties (vapor pressure, separation factor, and vapor composition) to change also. I have demonstrated experimentally that distillation of feed compositions high in iron, or carried out with ferrous alloy reboilers, results in a gradual slight depletion of the system in $POCl_3$. This shift in the chemical composition results in excess solid $(Zr,Hf)Cl_4$ being precipitated in the condenser.

This phenomenon was also observed by Williams et al., who experienced great difficulty with condenser plugging, temperature control, and vapor explosions resulting from partial blockages. I have observed that a system using iron-free feed material, and non-ferrous reboiler and column materials, experience much fewer problems with condenser blockage that may be controlled relatively easily.

High iron content in the feed will therefore result in reduced volatility of the feed, degraded separation factors, deposition of solids in the condenser, and increased corrosivity of the melt. It is therefore important to the successful operation of this process that efficient removal of iron be accomplished before the feed composition is synthesized. It is also clearly important to avoid the introduction of iron into the melt due to corrosion, so that use of non-ferrous materials in the reboiler and column are called for.

As indicated above, a molten system of NaCl, KCl, or a mixture thereof in a near-eutectic composition with $(Zr,Hf)Cl_4$ may be used as an effective system for removal of $FeCl_3$ from impure crude tetrachloride. The melting point of a eutectic mixture of 63 mole percent $(Zr,Hf)Cl_4$, 8% NaCl, and 29% KCl is given (Kim and Spink, *J. Chem. Eng. Data*, 19, 36, 1974) as 230° C. Solid $(Zr,Hf)Cl_4$ leaving the crude chlorination system is added to the molten salt sublimer, and dissolves in the melt, kept at approximately the tetrachloride sublimation temperature of 330° C. The liquid-phase adduct $(Na,K)_2(Zr,Hf)Cl_6$ which is formed is in continuous dissociation equilibrium with the vapor phase $(Zr,Hf)Cl_4$. The vapor pressure of tetrachloride over the melt may be kept at one atmosphere by adjustment of the melt temperature, such that purified $(Zr,Hf)Cl_4$ vapor may be continuously withdrawn from the system.

The iron chloride remains in the melt, exhibiting a very low vapor pressure at this temperature due to the greater stability of the $(Na,K)FeCl_4$ adduct. Iron, even if the feed has very low iron levels, will thus accumulate in the molten salt bath, as will the similar $(Na,K)AlCl_4$ adduct of aluminum. In addition to those chlorides bound as alkali metal chloride adducts, a number of other, low-volatility, chlorides will also be removed, including uranium and thorium. A bleed system should preferably therefore be removed, either continuously or periodically, from the molten salt sublimer.

The invention is not to be construed as limited to the particular example herein, as this is to be regarded illustrative, rather than restrictive. The invention is intended to cover all processes which do not depart from the spirit or the scope of the invention.

I claim:

1. In a method for separating hafnium tetrachloride from zirconium tetrachloride where a complex of zirconium-hafnium tetrachlorides and phosphorus oxychloride is prepared from zirconium-hafnium tetrachlorides and said complex of zirconium-hafnium tetrachlorides and phosphorus oxychloride is introduced into a distillation column, which distillation column has a reboiler connected at the bottom and a reflux condenser connected at the top and where a hafnium tetrachloride enriched stream is taken from the top of the column and a zirconium enriched tetrachloride stream is taken from the bottom of the column, the improvement comprising:

prepurifying said zirconium-hafnium tetrachlorides, prior to preparation of said complex and introduction of said complex into a distillation column, to substantially eliminate iron chloride from the zirconium hafnium tetrachlorides, whereby buildup or iron chloride in said distillation column and in said reboiler is substantially eliminated and said column can be operated in a continuous, stable and efficient manner.

2. The method of claim 1, wherein said prepurifying is performed by passing said zirconium-hafnium tetrachlorides through a molten salt purification-sublimination system prior to preparation of said complex of zirconium-hafnium tetrachlorides and phosphorus oxychloride.

3. The method of claim 2, wherein the molten salt in said molten salt purification-sublimination system consists essentially of a near-eutectic mixture of sodium chloride, potassium chloride, and zirconium-hafnium tetrachlorides, and impurities.

4. The method of claim 3, wherein said near eutectic mixture consists essentially of about 63 mole percent of zirconium-hafnium tetrachloride, about 8 mole percent sodium chloride, and about 29 mole percent potassium chloride.

5. The method of claim 3, wherein said purification-sublimination system is operated at about 330-380 degrees C.

6. The method of claim 1, wherein a distillation system using non-ferrous materials is utilized.

7. The method of claimi 1, wherein at least one of aluminum, uranium and thorium chloride is also removed during said prepurification.

* * * * *